(12) United States Patent
Khawaja et al.

(10) Patent No.: US 9,635,196 B2
(45) Date of Patent: Apr. 25, 2017

(54) SYSTEM FOR ENABLING SCAN-TO-EMAIL FUNCTIONALITY

(75) Inventors: Naveed Anis Khawaja, Welwyn Garden (GB); Maliha Naveed, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 497 days.

(21) Appl. No.: 12/872,774

(22) Filed: Aug. 31, 2010

(65) Prior Publication Data

US 2012/0050823 A1 Mar. 1, 2012

(51) Int. Cl.
*H04N 1/00* (2006.01)
(52) U.S. Cl.
CPC ..... *H04N 1/00225* (2013.01); *H04N 1/00212* (2013.01); *H04N 2201/3283* (2013.01)
(58) Field of Classification Search
None
See application file for complete search history.

(56) References Cited

U.S. PATENT DOCUMENTS

| 5,430,536 A | 7/1995 | Fullerton et al. |
| 6,112,039 A | 8/2000 | Salgado et al. |
| 6,385,769 B1 * | 5/2002 | Lewallen ............ 717/125 |
| 7,054,024 B2 * | 5/2006 | Salgado et al. ........... 358/1.15 |
| 7,212,304 B2 | 5/2007 | McIntyre et al. |
| 7,215,434 B1 * | 5/2007 | Janse et al. .................. 358/1.15 |
| 7,416,116 B2 | 8/2008 | Sardano |
| 7,865,831 B2 * | 1/2011 | Dooley et al. ............... 715/719 |
| 2008/0019476 A1 * | 1/2008 | Mirzayan ..................... 378/38 |
| 2008/0183905 A1 | 7/2008 | Kitada |
| 2008/0285090 A1 | 11/2008 | Stumbo |
| 2009/0077127 A1 | 3/2009 | Henry et al. |
| 2009/0279147 A1 | 11/2009 | Han et al. |
| 2009/0307322 A1 * | 12/2009 | Iwasawa et al. ............. 709/206 |
| 2009/0323115 A1 * | 12/2009 | Van Bergen et al. ........ 358/1.15 |
| 2010/0002271 A1 * | 1/2010 | Yamada ...................... 358/448 |

OTHER PUBLICATIONS

SecureZIP for Windows Command Line Users Manual, PKWARE, 2001.*

* cited by examiner

*Primary Examiner* — Paul F Payer
(74) *Attorney, Agent, or Firm* — Novel IP

(57) ABSTRACT

A scanner has a computer readable memory with programmatic instructions which are adapted to cause physical documents to be scanned, generate image data corresponding to the physical documents, in response to a scanning triggering event, electronically package image data into a unitary compressed file, and attach the unitary compressed file to an electronic message.

10 Claims, 9 Drawing Sheets

SYSTEM FOR ENABLING SCAN-TO-EMAIL FUNCTIONALITY

FIELD

The present specification discloses embodiments relating generally to enabling scan-to-email functionality within digital scanners (or multi-function devices) and, more specifically, to network bandwidth, processing power efficient, and user-friendly scan-to-email systems and methods.

BACKGROUND

Digital scanner devices are ubiquitously used in residential as well as commercial environments. Digital scanners are used either as standalone devices or integrated within multi-function devices (MFD) in which the functions of a copier, printer, scanner and/or facsimile are combined in a unified machine. Operationally, multiple-page hard-copy documents are manually or automatically fed into digital scanners or MFDS, referred to generally as scanners, resulting in multiple scanned image files corresponding to the hard-copy pages. In a scan-to-email function, the scanners generate multiple scan image files, output an electronic message, attach each of those separate scan image files to the electronic message, and email the message, with the image files, to the intended recipient(s) over a private or public network, such as the Internet.

However, scan-to-email scanner systems are typically constrained in that the recipient receives multiple, separate scanned image file attachments corresponding to one or more scan jobs, where each scan job could comprise more than one hard page. This requires the recipient to figure out which scanned image file attachment belongs to which scan job and manage multiple attachments, which may be very cumbersome.

Accordingly, there is need for more network bandwidth, processing power efficient, and user-friendly scan-to-email methods that enable multiple scanned image files (corresponding to multiple-page hard-copy documents) to be encoded and packaged into a compressed unitary file and sent as an email attachment to intended recipient(s).

SUMMARY

The presently disclosed system and method encompass a number of different embodiments enabling improved scanner to email functionality. In one embodiment, a scanner electronically scans a plurality of physical documents. It comprises a computer readable memory having a plurality of programmatic instructions which are adapted to cause said plurality of physical documents to be scanned; generate a plurality of image data corresponding to said plurality of physical documents; in response to a scanning triggering event, electronically package said image data into a unitary compressed file; and attach said unitary compressed file to an electronic message. It should be appreciated that the packaging of image data into a unitary compressed file can occur automatically upon completion of a scan job, which equates to a plurality of physical documents requiring scanning. The phrase a "scan" refers to the act of generating image data from one document within a plurality of documents. The phrase a "scan job" refers to the act of generating image data from all documents that define a plurality of documents.

Optionally, the triggering event can be the generation of a portion of said plurality of image data, the completion of a scan, the completion of a scan job, or after all of said plurality of physical documents are scanned. Optionally, the programmatic instructions are adapted to generate a display, before said scan job is initiated, for prompting a user to select whether compression should occur during a scan job. If compression during a scan job is selected, said plurality of programmatic instructions compress said image data prior to completion of a scan job. If compression during a scan job is not selected, said plurality of programmatic instructions compress said image data after completion of a scan job. It should be appreciated that the interface can provide for alternative selection methods, including designating whether compression during a scan job should not occur or whether compression should occur after a scan job. In either case, selection of such an option would result in the compression of image data after completion of a scan job.

Optionally, the system is adapted to evaluate said plurality of image data to determine a file size for said unitary compressed file. If said file size exceeds a predetermined threshold, said plurality of programmatic instructions generate a second unitary compressed file. Optionally, the plurality of programmatic instructions are adapted to generate a display, before said scan job is initiated, for prompting a user to input a recipient address for said electronic message. Optionally, the plurality of programmatic instructions are adapted to generate a display, before said scan job is initiated, for prompting a user to input a maximum file size for said unitary compressed file.

In another embodiment, a method enables the electronic scanning of a plurality of physical documents by receiving said plurality of physical documents to be scanned; generating a plurality of image data corresponding to said plurality of physical documents; in response to a scanning triggering event, electronically packaging said image data into a unitary compressed file; and automatically attaching said unitary compressed file to an electronic message. It should be appreciated that the "automatic" attachment of the unitary compressed file, such as a zip file, occurs, at the completion of a scan job, without requiring any additional human intervention. It should also be appreciated a unitary compressed file may be automatically generated and attached to an electronic message, again without human or manual intervention, even though a user had, prior to the initiation of a scan job, inputted selections directing the system to automatically generate a unitary compressed file and an email with the file attached thereto.

These and other embodiments shall be further explained and described in the Detailed Description section with reference to the Drawings.

BRIEF DESCRIPTION OF THE DRAWINGS

These and other features and advantages of the presently disclosed embodiments will be appreciated, as they become better understood by reference to the following detailed description when considered in connection with the accompanying drawings.

DETAILED DESCRIPTION

The present disclosure is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
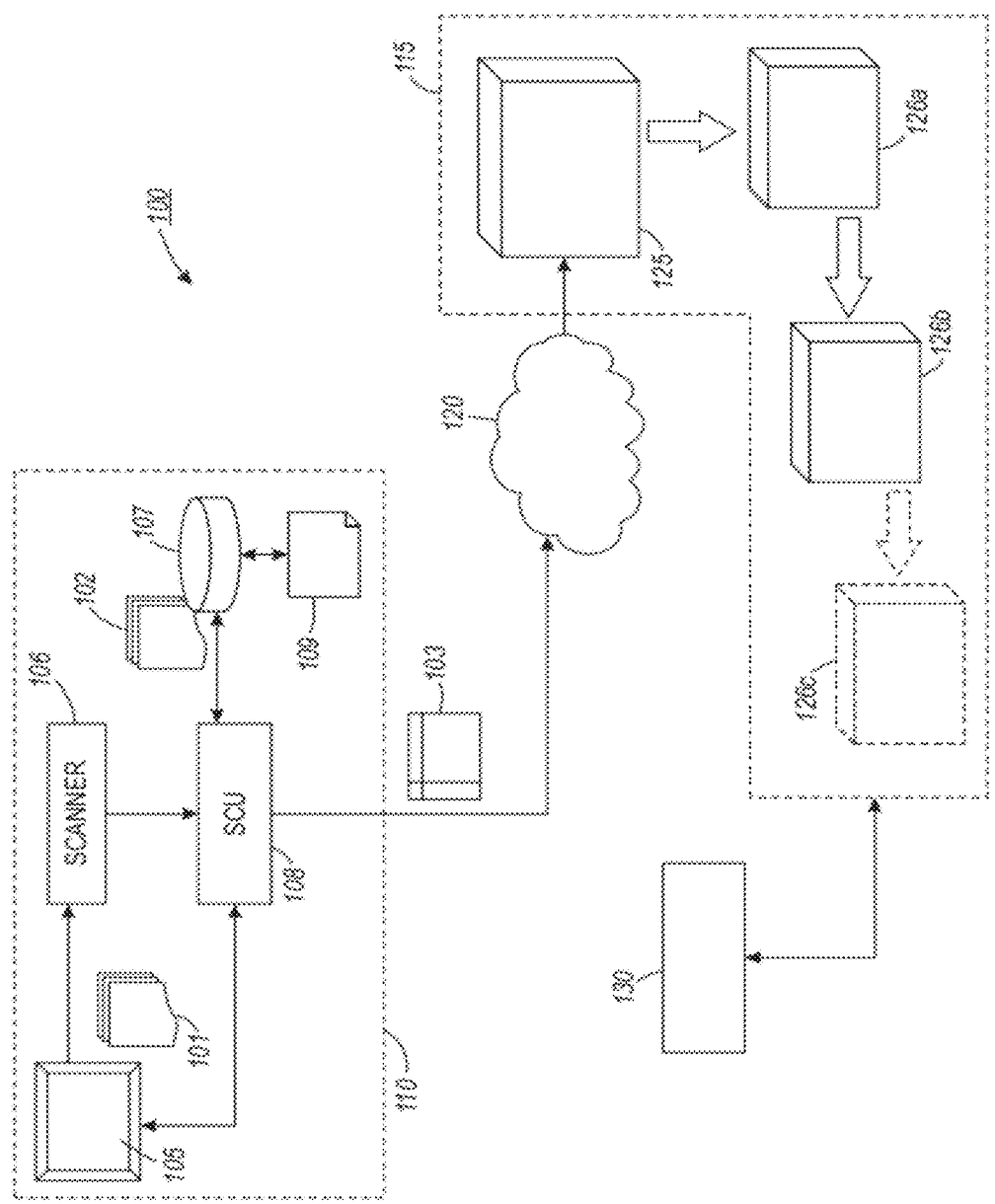
FIG. 1 shows one embodiment of a scan-to-email system disclosed herein.

FIG. 1 shows an embodiment of a scan-to-email system 100. System 100 comprises a scanning system 110 that is in communication with an email system 115 through a network 120. Persons of ordinary skill in the art would appreciate that the network 120 is any public (such as the Internet) and/or private network configuration such as a LAN, WAN, MAN and can be wired and/or wireless. In one embodiment, the scanning system 110 is a multi-function device (MFD) in which functions of a scanner, copier, printer and/or facsimile machine are combined in a unified architecture. It should be appreciated by persons of ordinary skill in the art that scanning system 110 is not limited to multi-functional devices and can include a single-function device such as a standalone digital scanner or any device that includes scanning capability.

In one embodiment, scanning system 110 comprises a software control unit 108 that controls and coordinates plurality of functions of the scanning system 110, such as those of a document handler 105, digital scanner 106, electronic memory 107 and file packager 109. The software control unit 108 comprises a CPU, such as a microprocessor. The scanning system 110 is configured to accept hard-copy originals placed in the document handler 105 and scan them, using scanner 106, such that images on the hard-copy originals are exposed onto one or more photosensitive chips (such as a CCD) of the scanner 106 to yield a quantity of digital image data In one embodiment, a typical scan-job is a multi-page document 101 constituting a plurality of hard-copy originals that are placed in document input tray of the document handler 105 for automatically or manually feeding simplex and/or duplex document sheets to be electronically imaged from one or both sides by the digital scanner 106 in forward (1 to N) serial order. The resultant plurality of scanned image data 102 is stored in electronic memory 107. In one embodiment, the document handler 105 is a 'Duplexing Automatic Document Handler' (DADH) such as that disclosed in U.S. Pat. No. 5,430,536, the disclosure of which is incorporated herein by reference in its entirety. The software control unit 108 accepts digital image data from the scanner 106 based on the scanned hard-copy originals of the scan-job. Persons of ordinary skill in the art should note that each page of the multi-page hard-copy document 101 is typically scanned to generate corresponding digital image data 102. Thus, a multi-page scan job comprising a hard-copy document of N pages would generate corresponding N digital image data. The resulting N digital image data are retained within memory 107 in a suitable image format such as TIFF, JPEG, PDF, XPS, Multi-Page Tiff or any other image format as would be readily evident to persons of ordinary skill in the art. In one embodiment, the image format is user-selectable.

In one embodiment, while operating the scanning system 110, user is presented with a graphical user interface (GUI), which can be activated or otherwise interacted with via a touch screen, keyboard, keypad, mouse or other form of data input device, to enable the user to input certain data. In one embodiment, such data includes the preferred image format of the output scanned image files, whether the generated image files are to be emailed as attachments, printed, faxed, copied, or whether the generated image files are to be compressed into a unitary file and then emailed as attachments.

Figure 2A:
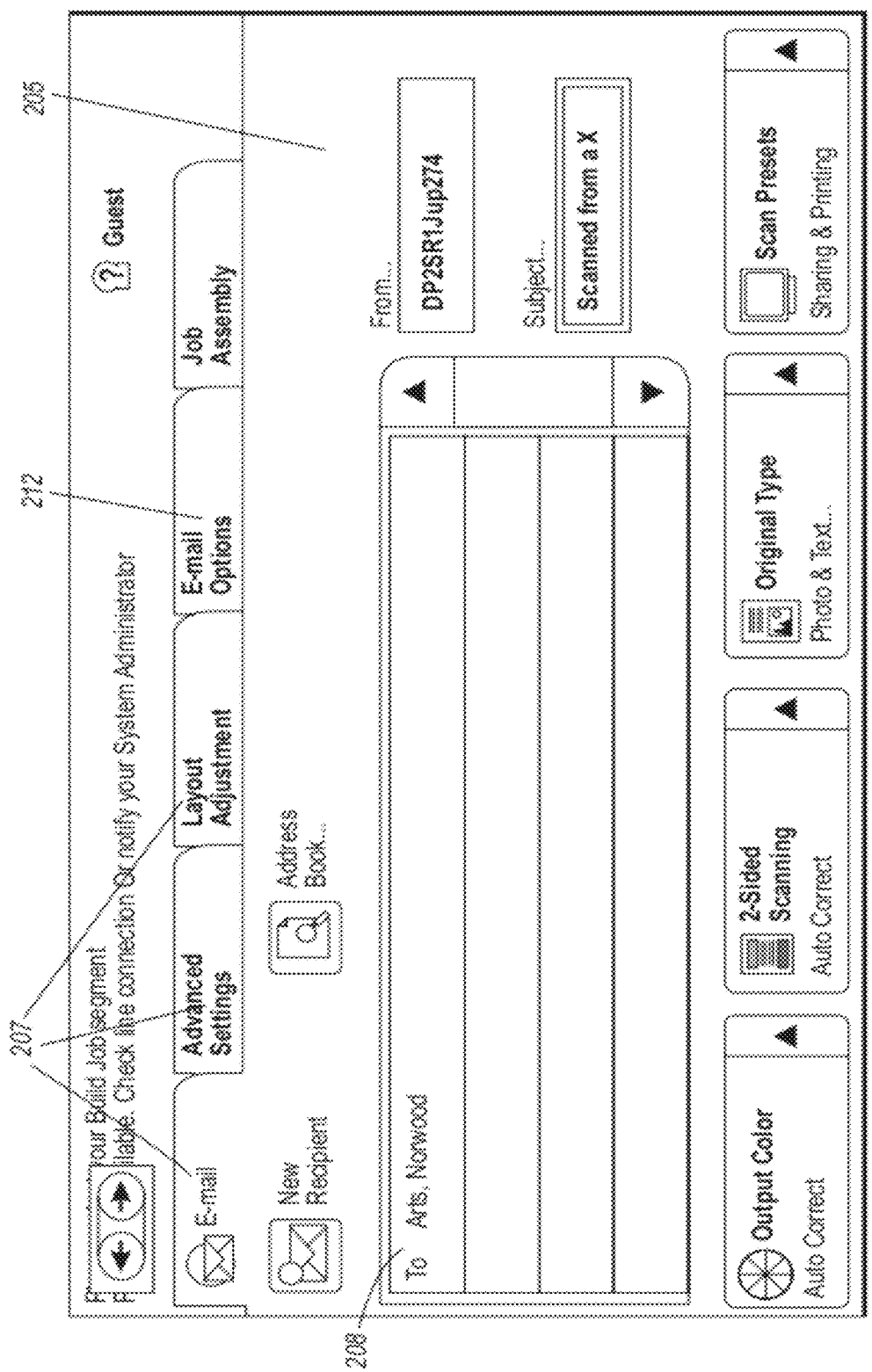
FIG. 2a depicts a first GUI screen for user to select email function and enter email address of the recipient(s)
Figure 2B:
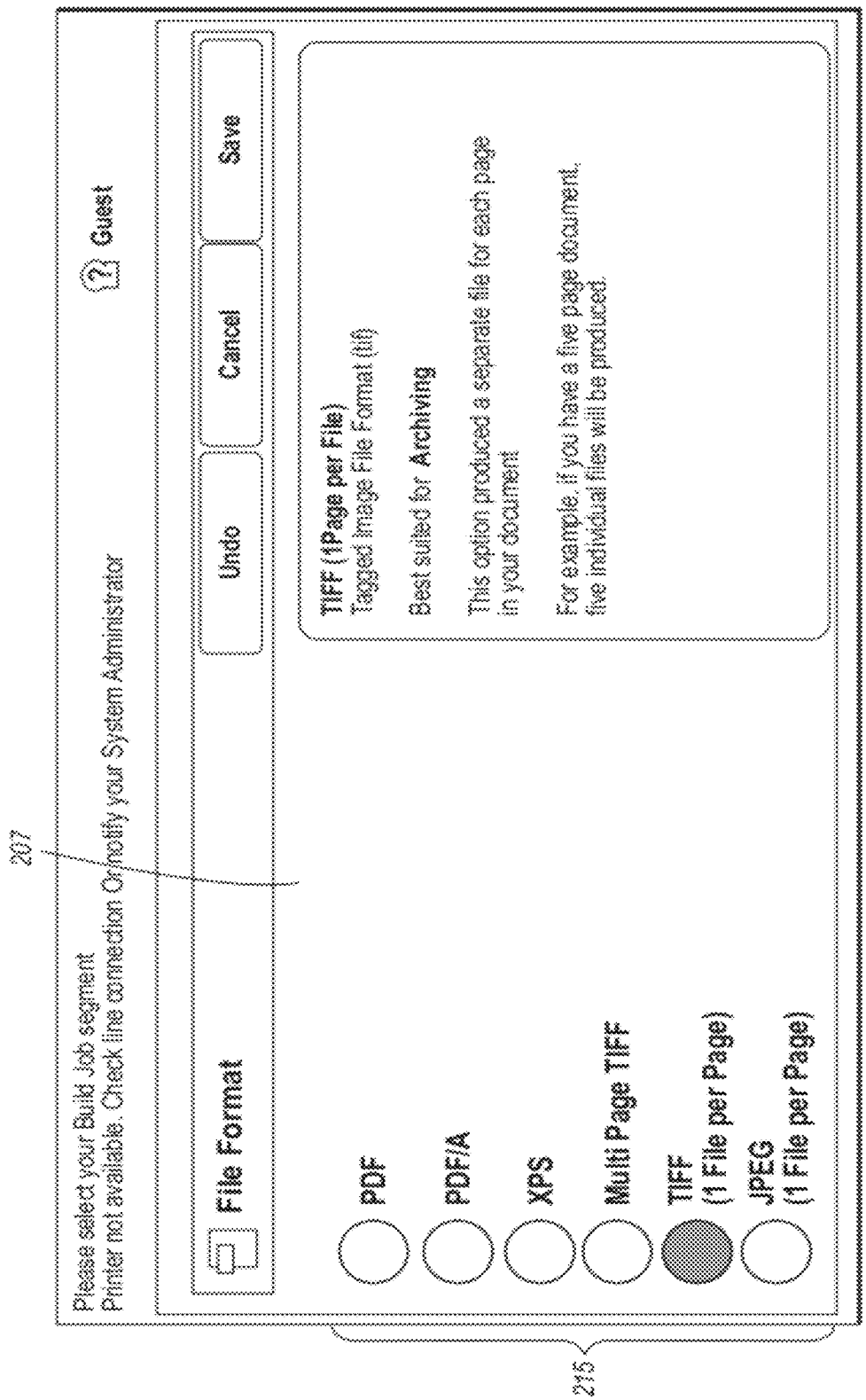
FIG. 2b depicts a second GUI screen for user to select format for scanned image files.

Referring to FIG. 2a, a first GUI screen 205 is shown having a plurality of tabs 207 with an email tab selected. The first GUI screen 205 presents a user with an email function in which a user can input an email address 208 of the recipient of the scanned image data. Thereafter, the user selects email option tab 212 as a result of which the user is presented with a second GUI screen 210, shown as FIG. 2b, and prompted to select from a plurality of scanned image data formats 215 in which the system 100 may output the scanned image files.

Conventionally, every scanned page of the hard-copy results in a corresponding scanned image file. In other words, for a hard-copy original document of, for example, five pages, five separate corresponding scan image files are produced (one for each page of the hard-copy original document). If a user has selected an automatic email option, multiple scanned image files are attached to a single email. This results in inefficient use of network bandwidth, as well as confusion for the recipient who receives multiple unorganized image files.

According to one embodiment disclosed herein, multiple scanned image files corresponding to a particular multi-page scan job are electronically packaged together into a unitary compressed file and sent, as a single attachment, via email. Referring back to FIG. 1, the software control unit 108 prompts the file-packager 109 to access, process, and electronically package the N digital image files 102 (resulting from scan of the corresponding N pages of the multi-page scan job) residing in memory 107. The software control unit 108 prompts the file-packager 109 to access and process the N digital image files 102 based on any number of triggering events, including the completion of a scanning job, the initiation of a scanning job, the creation of one or more digital image files 102, or the creation of a predefined number of digital image files 102, without any further human intervention. The term electronically package, as used herein, means using a computing device to arrange image data having multiple pages, including, optionally, associated metadata or log data, so that the multi-page images are retained in a single file and can be referenced, by name, as a single file. The term a unitary compressed file, as used herein, means a single file within which multi-page images, including, optionally, associated metadata or log data, are arranged and to which an encoding process has been applied to lower the memory footprint, or size, of the file relative to a file that has not been subjected to such encoding process.

The file-packager 109 is a software application that encodes the scanned N image files 102 into a unitary file 103. In one embodiment, the encoding optionally uses fewer bits (or other information-bearing units) than an un-encoded representation would otherwise use, through use of suitable encoding scheme(s) such as, for example, the DEFLATE variation of the Lempel-Ziv (LZ) compression method used in tools such as PKZIP, GZIP and PNG. The DEFLATE compression method is described in IETF RFC 1951. Other encoding methods, known to persons of ordinary skill in the art, can be alternatively used. In one embodiment, processing of the N image files using DEFLATE encoding method results in a unitary .ZIP compressed file. As known to persons of ordinary skill in the art, the .ZIP File Format Specification is an open format and details following methods: stored (no compression), Shrunk, Reduced (methods 1-4), Imploded, Tokenizing, Deflated, Deflate64, BZIP2, LZMA (EFS), WavPack, and PPMd. It should be appreciated that the file-packager software application comprises a plurality of programmatic instructions, executed by one or more processors of the system 100, which receives, as an input, each of the scanned images and generates, as an output, an encoded unitary file that, relative to the input scanned images is compressed or otherwise occupies less memory.

Whether done automatically after creation of a unitary compressed filed or prompted by the user, the unitary file comprising encoded multiple scanned image files (of the multi-page scan job) is attached to an electronic mail (email) message 103 and sent to the recipient 130 using the email system 115. In one embodiment, the email system 115 enables the email 103 to be sent to a first server 125, which is typically an SMTP or other server known to persons of ordinary skill in the art. The email 103 is then relayed from first server 125 to a chain of subsequent servers 126*a*, 126*b*, 126*c*, as may be required. In typical e-mail systems, an e-mail message passes through a plurality of servers until a desired destination is reached. At the message's destination, a server 126*c*, such as a POP3 or IMAP server, as generally known in the art, retains the email 103 for access by a recipient/client application program 130 associated therewith, such as a personal computer having an e-mail account.

Figure 3:
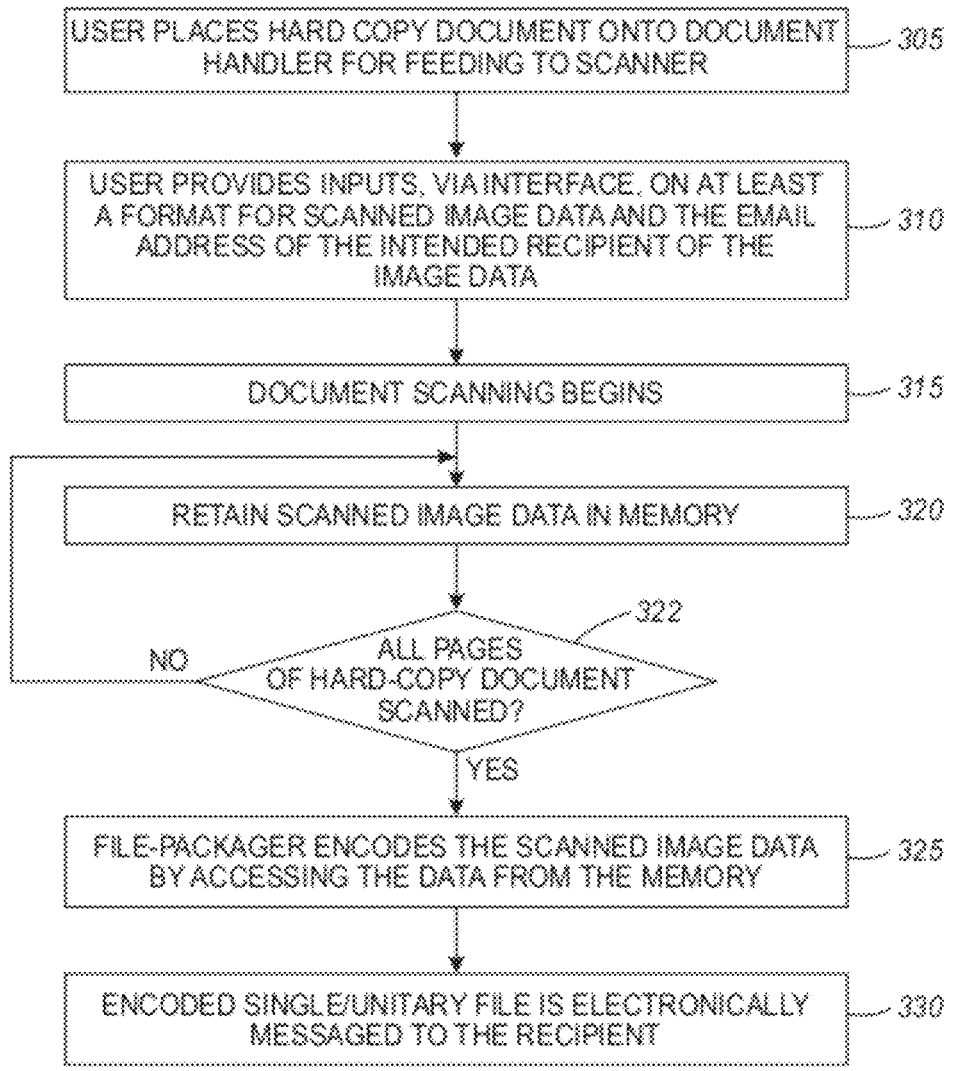
FIG. 3 is a flow chart showing exemplary steps of a post-scan compression in one embodiment of the scan-to-email system disclosed herein.

FIG. 3 is a flow chart showing exemplary steps of one embodiment of the disclosed system. Referring to FIGS. 1 and 3 simultaneously, during operation a user places 305 a hard-copy document, which, in one embodiment, comprises a plurality of pages, into a manual or automatic document handler of the scanner. The scanner generates, via a processor, memory, and display, at least one interface which prompts a user to choose a suitable format in which to generate the scanned image data and to input email addresses of the recipient(s) to whom the scanned image data is to be sent via email 310. In one embodiment, the interface is a plurality of GUI touch screens as described with reference to FIGS. 2*a* and 2*b*. Alternatively, however, the interface could simply display icons with a keyboard or mouse, switches, or buttons with or without corresponding screen visuals for the sender to provide relevant data input.

Once the user has provided the necessary selections, document scanning is initiated 315 wherein the document handler feeds document sheets to be electronically imaged by the digital scanner. The resultant plurality of scanned image data, one for each hard-copy original sheet, is retained in memory 320. The system periodically checks, via a sensor integrated into the document handler or scanner, whether or not all the submitted hard-copy pages have been scanned 322. When all the hard-copy pages have been scanned, the software control unit prompts the file-packager to access the plurality of scanned image data from memory and encode the data into a unitary file 325. In one embodiment, the encoded unitary file is compressed into a compressed file having, for example, a .zip file format compression format. The encoded single unitary file is then electronically messaged (emailed) to the recipient's email address as an attachment 330.

In this embodiment, all scanned image files, corresponding to a multi-page hard copy document, are first generated and then, after scanning is complete (one exemplary triggering event), the generated image files are encoded to generate a compressed unitary file (hereinafter referred to as 'post-scan compression'), as has been described with reference to the flow chart of FIG. 3.

In another embodiment, compression of generated image files and the creation of a unitary file is done while scanning of the hard copy documents is still in progress. In this embodiment, the system presents the user, via a graphical user interface, with an option to choose if he or she would like the already scanned image files to be compressed individually and concurrently while other image files are still being created or while the scan is still progressing. Thus, as each page of the hard-copy document is scanned, the resulting corresponding image file is compressed and added to a unitary file, resulting in plurality of individual compressed image files in a unitary file at the completion of the scanning process. The concurrent compression of individual scanned image files enables the final unitary compressed file creation (packaging of already compressed files) to be faster. Here, the triggering event corresponds to the creation of one or more scanned images.

Figure 4:
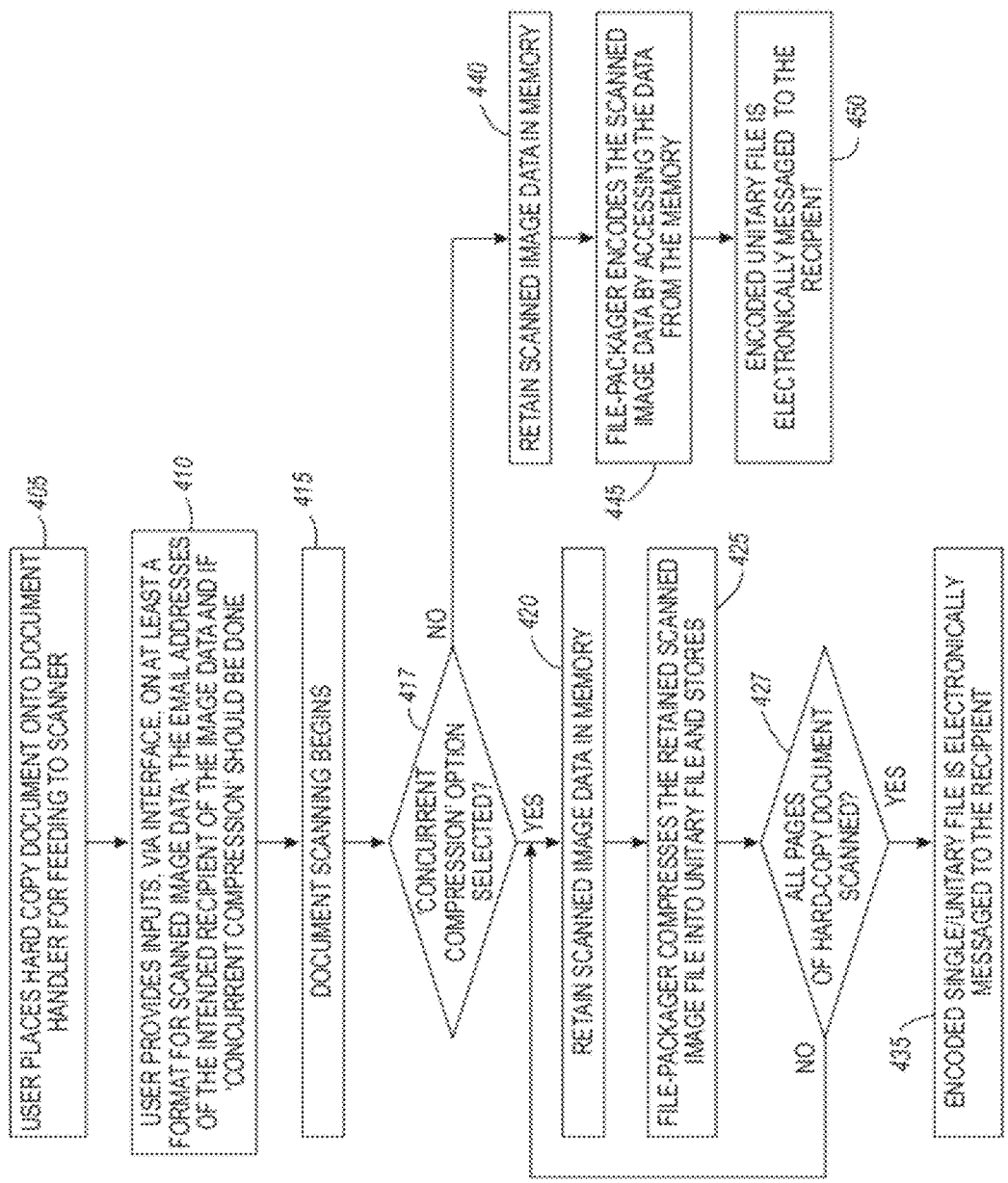
FIG. 4 is a flow chart showing exemplary steps of a concurrent compression option in one embodiment of the scan-to-email system disclosed herein.
Figure 5:
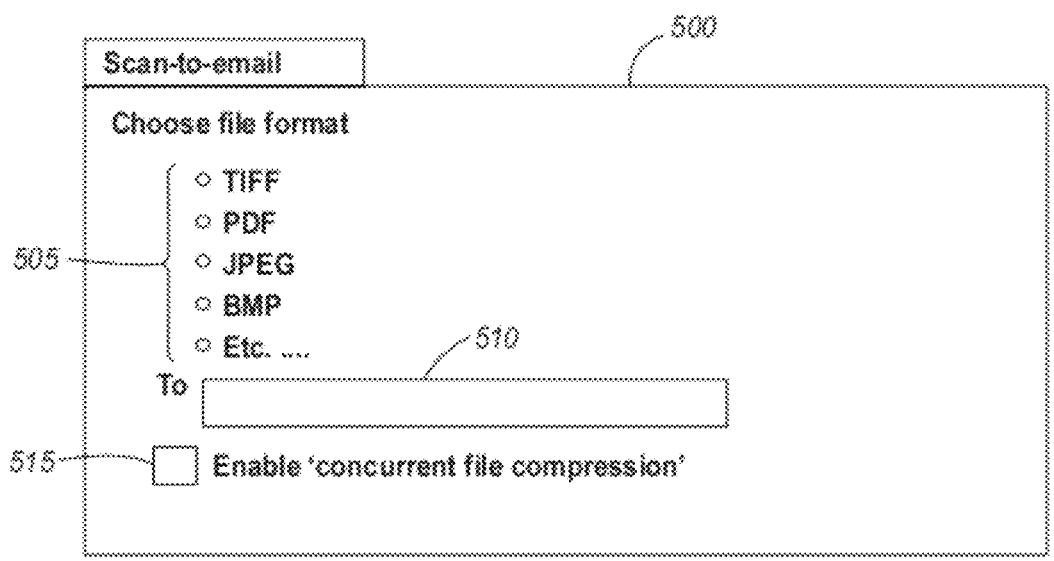
FIG. 5 is an exemplary GUI that allows user to select options related to the steps shown in FIG. 4.

FIG. 4 is a flow chart showing exemplary steps of an embodiment that allows the compression of scanned image files concurrent to the scanning process. Referring to FIGS. 1 and 4 simultaneously, a user places 405 a hard-copy document, which in one embodiment comprises a plurality of pages, into the document handler of the scanner. The scanner generates, via a processor, memory, and display, at least one interface which prompts a user to choose a suitable format in which to generate the scanned image data, to input email addresses of the recipient(s) to whom the scanned image data is to be sent via email, and/or to choose if scanned image files should be compressed concurrently while the scanning process of the remaining multi-page hard-copy document is still in progress (hereinafter referred to as the 'concurrent compression' option) 310. FIG. 5 shows an exemplary GUI 500 that provides the user with file format options 505 and a field 510 to input email address(es) of recipient(s) and to additionally select the 'concurrent compression' option 515.

Once the user has provided the necessary selections, document scanning is initiated 415 wherein the document handler feeds document sheets to be electronically imaged (from one or both sides) by the scanner. If the user selected the 'concurrent compression' option then, at step 417, as the first scanned image file for the corresponding first page of the multi-page hard-copy document is generated, the image file is retained 420 in memory. Subsequently, the software control unit prompts the file-packager to access the scanned image file from memory and compress the file into a unitary file while scanning of the remaining pages of the hard-copy document is in progress 425. The compressed unitary file is stored in the memory 425. Scanned image file compression is repeated for each image file that is being generated while the scanning process is in progress. The system tracks whether or not all hard-copy pages have been scanned 427. When all pages of the hard-copy document have been scanned, the memory will comprise a unitary compressed file having each of the individual image files corresponding to the plurality of pages of the hard-copy document. Accordingly, a user need not wait for the unitary file to be generated, thereby saving time. In one embodiment, the encoded unitary file is subjected to a secondary compression. The encoded unitary file is then electronically messaged (emailed) 435 to the recipient's email address as an attachment.

However, if the user does not select the 'concurrent compression' option 417 then, the system retains scanned image data in memory 440, a file-packager encodes 445 scanned image data into a unitary file by accessing memory after scanning is complete and then the system attaches the unitary file to an email and electronically transmits the email to the recipient 450.

Where pages being scanned are graphic intensive, concurrent compression may unduly slow the operation of the system. Therefore, in one embodiment, where the user chooses the concurrent compression option, the system tracks processor usage and determines whether it would be faster or more efficient to perform post-scan compression because concurrent compression is determined to require too much processing power during the scanning process.

Figure 6:
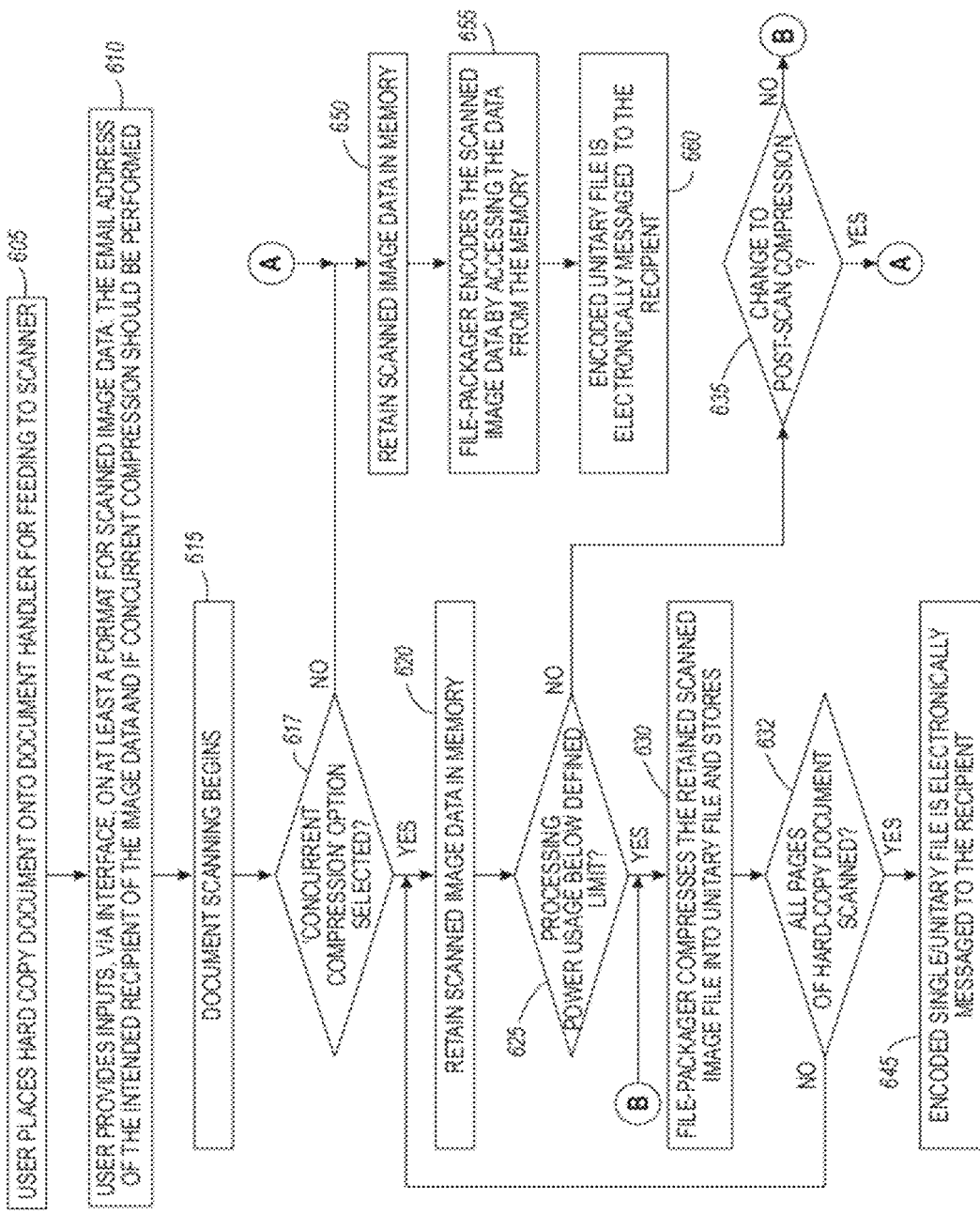
FIG. 6 is a flow chart showing exemplary steps where a user can switch back to post-scan compression if concurrent compression results in excessive processing power utilization.

FIG. 6 is a flow chart showing exemplary steps of an embodiment in which the system prompts a user to switch back to post-scan compression or the system automatically switches back to post-scan compression if concurrent compression results in excessive processing power utilization. Referring to FIGS. 1 and 6 simultaneously, during operation, a user places 605 a hard-copy document, which comprises a plurality of pages, into the document handler of the scanner. The scanner generates, via a processor, memory, and display, at least one interface which prompts a user to choose a suitable format in which to generate the scanned image data, to input email addresses of the recipient(s) to whom the scanned image data is to be sent via email, and/or to choose if scanned image files should be compressed concurrently while the scanning process of the remaining multi-page hard-copy document is still in progress 610. FIG. 5 shows an exemplary GUI 500 that provides the user with file format options 505 and a field 510 to input email address(es) of recipient(s) and to additionally select the 'concurrent compression' option 515.

Once the user has provided the requested selections, the scanner initiates document scanning 615 where the document handler feeds sheets to be electronically imaged (from one or both sides) into the scanner. If the user selected the 'concurrent compression' option 617 then, as the first scanned image file for the corresponding first page of the multi-page hard-copy document is generated, the image file is retained 620 in memory. Subsequently, the software control unit prompts the file-packager software to access the scanned image file from memory and compress 630 the file into a unitary file, such as into a .ZIP file format, while scanning the remaining pages of the hard-copy document is in progress. The compressed scanned image file within the unitary file is then stored back in the memory. The scanned image file compression is repeated for each image file that is being generated while the scanning process is in progress. The system monitors whether or not all hard-copy pages have been scanned 632. During the scanning and 'concurrent compression' process, the system also monitors, via a controller or processor, the processing power of the system being utilized to simultaneously scan images and compress them into a unitary file. When the processing power utilization of the system reaches a pre-defined limit, the system automatically switches operation to a post-scan compression mode or, alternatively, presents to the user an option to switch to post-scan compression 635.

If the system automatically chooses to, or is prompted by the user to, opt for post-scan compression, then all remaining scanned image files are allowed to be retained 650 in memory without concurrent compression. In this embodiment, when all pages of the hard-copy document have been scanned, the memory will comprise a combination of individual compressed as well uncompressed image files corresponding to the plurality of pages of the hard-copy document scanned. Subsequently, the software control unit prompts the file-packager software to access the plurality of files from memory and encode the files into a single unitary file 655. In one embodiment, the encoded single unitary file is also compressed into, for example, a .zip file format. The encoded single unitary file is then electronically messaged (emailed) 660 to the recipient's email address as an attachment.

If post-scan compression is not selected or if the processing power utilization remains less than the pre-defined limit, the system activates the file packager, which compresses generated and stored images into a unitary file 630, as previously described. However, if the user does not select the 'concurrent compression' option 617 then, the system retains scanned image data in memory 650, a file-packager encodes 655 scanned image data into a unitary file by accessing memory after scanning is complete and then the system attaches the unitary file to an email and electronically transmits the email to the recipient 660.

In an alternate embodiment, the system is configured to engage in concurrent compression by default, thus obviating the need to present the option of concurrent compression to the user and therefore also obviating the need for the concurrent compression check 617. In this embodiment, the system automatically switches between concurrent compression and post-scan compression if the system monitor determines concurrent compression requires too much processing power.

In one embodiment, the system may allow the user to pre-define a unitary compressed file size. Therefore, as the individual image files are generated, compressed and added to a unitary file, the system monitors, via a controller and/or processor, the memory size of the unitary file and, when the unitary file sizes reaches, but does not exceed, the user defined size limit, a second unitary compressed file is automatically created. This occurs for all image files as they are created during scanning As unitary compressed files (in accordance with the user-defined size limit) are automatically created, in one embodiment, a name is assigned to the unitary file in accordance with a naming convention that may also be pre-defined by the user. For example, the naming convention could be Archive # where '#' is a system assigned numeral (such as 1, 2, 3, etc.). Thus, in this embodiment, a scan job comprising a multi-page hard-copy document could result in multiple single/unitary files (of concurrently compressed multiple image files) in accordance with the size limit set by the user.

Figure 7:
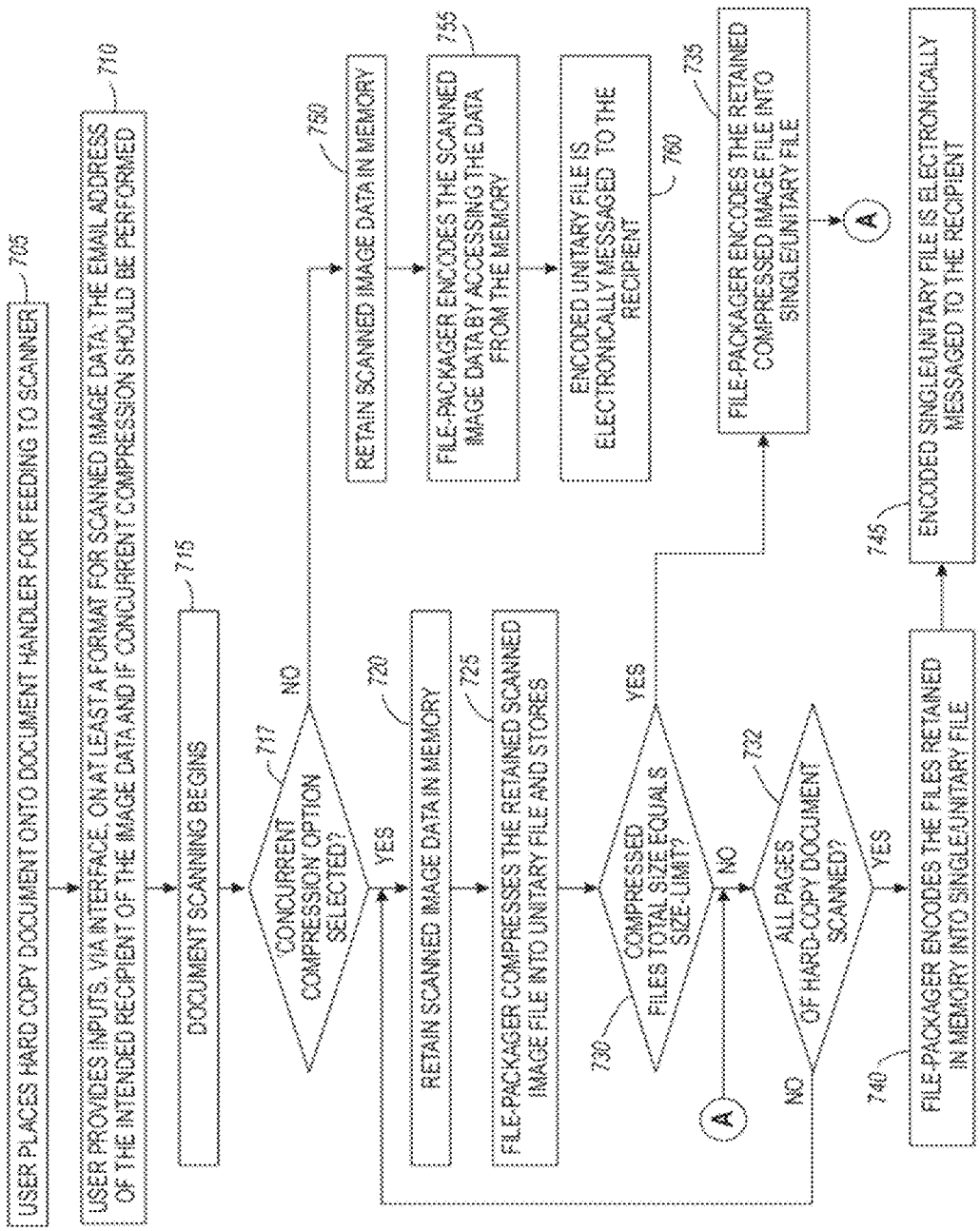
FIG. 7 is a flow chart showing exemplary steps where a user is allowed to pre-define the size limit that a unitary compressed file would have.

FIG. 7 is a flow chart showing exemplary steps of the method of the present invention where a user is allowed to pre-define the size-limit that a single/unitary compressed file would have. Referring to FIGS. 1 and 7 simultaneously, during operation a user places 705 a hard-copy document, which in one embodiment comprises a plurality of pages/sheets, into the document handler 105 of the digital scanner 106.

The scanner generates, via a processor, memory, and display, at least one interface which prompts a user to choose a suitable format in which to generate the scanned image data, to input email addresses of the recipient(s) to whom the scanned image data is to be sent via email, to choose if scanned image files should be compressed concurrently while the scanning process of the remaining multi-page hard-copy document is still in progress, and/or set a size limit for compressed single unitary files 710.

Figure 8:
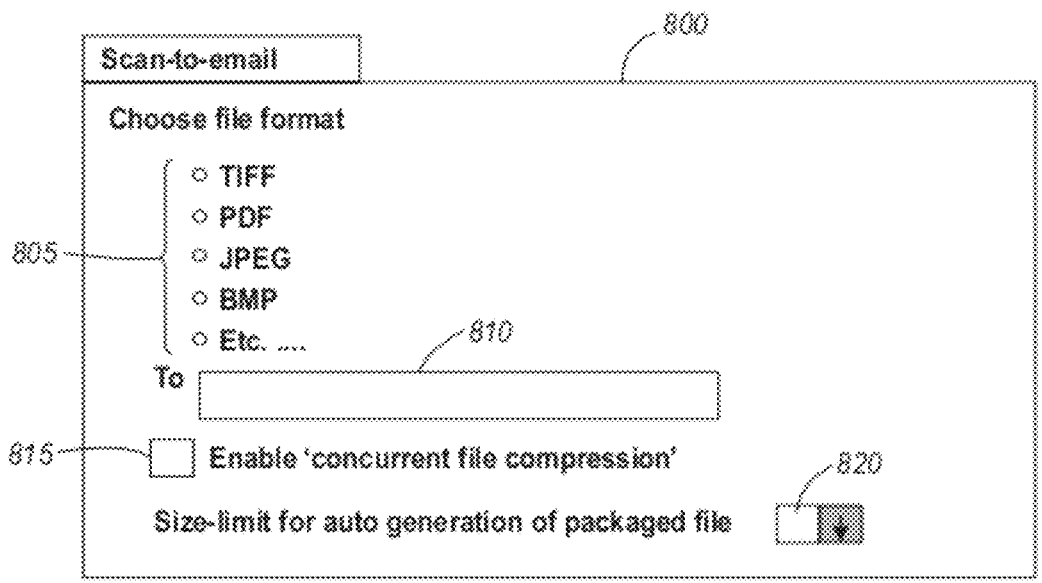
FIG. 8 is an exemplary GUI that allows user to select options related to the steps of FIG. 7.

FIG. 8 shows an exemplary GUI 800 that provides the user with file format options 805; field 810 to input email address(es) of recipient(s); 'concurrent compression' option 815 and drop down box 820 to set the size-limit at which compressed image files are packaged/encoded into single/unitary files.

Once the user has provided the necessary inputs, document scanning is initiated 715 wherein the document handler 105 automatically feeds document sheets to be electronically imaged (from one or both sides) by the digital scanner 106. If the user selected the 'concurrent compression' option 717, then, as the first scanned image file for the corresponding first page of the multi-page hard-copy document is generated, the image file is retained 720 in memory 107. Subsequently, the software control unit 108 prompts the file-packager software 109 to access the scanned image file from memory 107 and compress 725 the file, such as into a .ZIP file format, while scanning of the remaining pages of the hard-copy document is in progress. The thus compressed scanned image file is stored back in the memory 107. The scanned image file compression is repeated for each image file that is being generated while the scanning process is in progress. The system tracks 732 whether or not all hard-copy pages have been scanned. A counter additionally tracks 730 the cumulative size of the compressed scanned image files being stored in memory 107. When the total size of the compressed scanned image files, in memory 107, reaches the user-defined set size-limit the software control unit 108 prompts the file-packager software 109 to access these compressed image files and encode 735 them into a single/unitary file 103. In one embodiment, the encoded single/unitary file 103 is also compressed. A .Zip file format is an example of such compressed unitary file.

As a result, when all pages of the hard-copy document have been scanned, the memory 107 may comprise a plurality of individual compressed image files and/or a plurality of single/unitary compressed files (in accordance with the set size-limit) corresponding to the plurality of pages of the hard-copy document scanned.

Subsequently, the software control unit 108 prompts the file-packager software 109 to access the plurality of files from memory 107 and encode 740 the files into a single/unitary file 103. In one embodiment, the encoded single/unitary file 103 is also compressed. A .Zip file format is an example of such compressed unitary file. The encoded single/unitary file 103 is then electronically messaged (emailed) 745 to the recipient's email address as an attachment.

In another embodiment, a log file is generated for, and packaged within, each unitary compressed file. The log file defines, in a text, column, or other data format, a name of a scanned image, a corresponding page number in the scanned images, or any other information required to track which unitary compressed file contains a corresponding scanned image.

However, if the user does not select the 'concurrent compression' option 717, then the system retains 750 scanned image data in memory 107, encodes 755 scanned image data by accessing memory 107 and electronically transmits, via email, the generated encoded unitary file 760 to the recipient's address. That is, by default, in one embodiment, the system allows image files for all pages of the multi-page hard-copy document to be first generated and then encoded (that is compressed and packaged into a single/unitary file) on all scanned image files in accordance with 'post-scan compression'.

In an alternate embodiment, the method is configured to allow for 'concurrent compression' by default, thus obviating the need to present the option of 'concurrent compression' and therefore also obviating the need for the check of concurrent compression.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A scanner for electronically scanning a plurality of physical documents, comprising a computer readable memory having a plurality of programmatic instructions which are adapted to:
   generate a display, before a scan job is initiated, for prompting a user to select whether compression should occur during the scan job, wherein the scan job comprises a scan of each of said plurality of physical documents;
   cause a first document of said plurality of physical documents to be scanned;
   generate a first image data of a plurality of image data corresponding to a scan of the first document of said plurality of physical documents;
   format the first image data into a TIFF, JPEG, PDF, XPS, or Multi-Page TIFF image format;
   if compression during the scan job is selected, compress said formatted first image data prior to completing all of the scans that comprise the scan job and electronically package said compressed formatted first image data into a unitary compressed file prior to completing all of the scans that comprise the scan job;
   subsequently generate remaining image data of the plurality of image data corresponding to a portion of remaining scans of documents of said plurality of physical documents;
   format the remaining image data into a TIFF, JPEG, PDF, XPS, or Multi-Page TIFF image format;
   if compression during the scan job is selected, compress said formatted remaining image data prior to completing all of the scans that comprise the scan job and electronically package said formatted remaining image data into the unitary compressed file prior to completing all of the scans that comprise the scan job, thereby yielding the unitary compressed file with compressed formatted image data corresponding to all of said plurality of physical documents upon scanning, formatting, and compressing a last of said plurality of physical documents; and attach said unitary compressed file to an electronic message.

2. The scanner of claim 1 wherein said plurality of programmatic instructions are adapted to evaluate said plurality of image data to determine a file size for said unitary compressed file.

3. The scanner of claim 2 wherein, if said file size exceeds a predetermined threshold, said plurality of programmatic instructions generate a second unitary compressed file.

4. The scanner of claim 1 wherein said plurality of programmatic instructions are adapted to generate a display, before a scan job is initiated, for prompting a user to input a recipient address for said electronic message.

5. The scanner of claim 1 wherein said plurality of programmatic instructions are adapted to generate a display, before a scan job is initiated, for prompting a user to input a maximum file size for said unitary compressed file.

6. A method for electronically scanning a plurality of physical documents, comprising:

receiving said plurality of physical documents to be scanned;

generating a display, before a scan job is initiated, for prompting a user to select whether compression should occur during the scan job, wherein the scan job comprises a scan of each of said plurality of physical documents;

generating a first image data of a plurality of image data corresponding to a scan of a first document of said plurality of physical documents;

formatting the first image data into a TIFF, JPEG, PDF, XPS, or Multi-Page TIFF image format;

electronically packaging said formatted image data into a unitary compressed file prior to completing all of the scans that comprise the scan job;

subsequently generating remaining image data of the plurality of image data corresponding to a portion of remaining scans of documents of said plurality of physical documents;

formatting the remaining image data into a TIFF, JPEG, PDF, XPS, or Multi-Page TIFF image format;

electronically packaging said formatted remaining image data into the unitary compressed file prior to completing all of the scans that comprise the scan job, thereby yielding the unitary compressed file with formatted image data corresponding to all of said plurality of physical documents upon scanning and formatting a last of said plurality of physical documents;

automatically attaching said unitary compressed file to an electronic message.

7. The method of claim 6 further comprising determining a file size for said unitary compressed file.

8. The method of claim 7 further comprising generating a second unitary compressed file if said file size exceeds a predetermined threshold.

9. The method of claim 6 further comprising generating a display, before a scan job is initiated, for prompting a user to input a recipient address for said electronic message.

10. The method of claim 6 further comprising generating a display, before a scan job is initiated, for prompting a user to input a maximum file size for said unitary compressed file.

\* \* \* \* \*